United States Patent
Dooley et al.

(10) Patent No.: US 12,462,185 B2
(45) Date of Patent: Nov. 4, 2025

(54) SCENE GRAMMAR BASED REINFORCEMENT LEARNING IN AGENT TRAINING

(71) Applicant: Accenture Global Solutions Limited, Dublin (IE)

(72) Inventors: Robert P. Dooley, Dublin, CA (US); Dylan James Snow, Concord, CA (US)

(73) Assignee: Accenture Global Solutions Limited, Dublin (IE)

( * ) Notice: Subject to any disclaimer, the term of this patent is extended or adjusted under 35 U.S.C. 154(b) by 949 days.

(21) Appl. No.: 16/996,310

(22) Filed: Aug. 18, 2020

(65) Prior Publication Data
US 2022/0058510 A1    Feb. 24, 2022

(51) Int. Cl.
*G06N 20/00* (2019.01)
*G06F 40/211* (2020.01)
*G06N 3/006* (2023.01)
*G06N 3/126* (2023.01)
*G06N 5/04* (2023.01)

(52) U.S. Cl.
CPC .............. *G06N 20/00* (2019.01); *G06N 5/04* (2013.01)

(58) Field of Classification Search
CPC ............ G06N 20/00; G06N 5/04; G06N 3/00; G06N 3/126; G06N 3/006; G06F 40/211
See application file for complete search history.

(56) References Cited

U.S. PATENT DOCUMENTS 9,754,221 B1 * 9/2017 Nagaraja ................ G06N 3/045
2019/0047149 A1 * 2/2019 Wouhaybi .............. B25J 9/1666

OTHER PUBLICATIONS

Author: Sermanet et al. Title: Time-Contrastive Networks: Self-Supervised Learning from Video Date: May 21, 2018 Publisher: IEEE (Year: 2018).*
Author: Puig et al. Title: VirtualHome: Simulating Household Activities via Programs Date: Jun. 19, 2018 Publisher: arXiv (Year: 2018).*
Author: Yang et al. Title: Robot Learning Manipulation Action Plans by "Watching" Unconstrained Videos from the World Wide Web Date: 2015 (Year: 2015).*
Authors: Aguilar et al. Title: Pedagogical Virtual Agents to Support Training of Human Groups Date: Dec. 4, 2006 (Year: 2006).*

(Continued)

*Primary Examiner* — David Yi
*Assistant Examiner* — Amy Tran
(74) *Attorney, Agent, or Firm* — Polsinelli PC (57) ABSTRACT

Methods, systems, and apparatus, including computer programs encoded on a computer storage medium, for reinforcement learning in agent training. Agents may be trained using reinforcement learning. The methods, systems, and apparatus include actions of obtaining scene grammars, obtaining a reference video of a reference agent performing a task, generating environments from the scene grammars, determining that behavior of a sample agent shown in a particular environment of the environments matches behavior of the reference agent, storing an indication that the particular environment trains agents to perform the task, determining to train a new agent to perform the task, identifying the particular environment based on the indication, and training the new agent to perform the task in the particular environments identified.

11 Claims, 5 Drawing Sheets

(56) References Cited

OTHER PUBLICATIONS

Authors: Sermanet et al. Title: Time-Contrastive Networks: Self-Supervised Learning from Video Date: May 21-25, 2018 (Year: 2018).*
Authors: Puig et al. Title: VirtualHome: Simulating Household Activities via Programs Date: Jun. 19, 2018 (Year: 2018).*
Authors: O'Neill et al. Title: Evolutionary design using grammatical evolution and shape grammars: designing a shelter Date: Jan. 2010 (Year: 2010).*
Title: Learning through Imitation and Reinforcement Learning: Toward the Acquisition of Painting Motions Authors: Sakato et al Date: Dec. 1, 2014 (Year: 2014).*
Bagnell et al., "Policy search by dynamic programming," Proceedings of the Conference on Neural Information Processing Systems: Advances in Neural Information Processing Systems 16, Dec. 8-13, 2003, Vancouver, Canada, 8 pages.
Da Silva et al., "Object-Oriented Curriculum Generation for Reinforcement Learning," Proceedings of the 17th International Conference on Autonomous Agents and MultiAgent Systems, Jul. 10-15, 2018, Stockholm, Sweden, 9 pages.
Gupta et al., "Cooperative Multi-agent Control Using Deep Reinforcement Learning," Proceedings of the International Conference on Autonomous Agents and Multiagent Systems, May 8-12, 2017, Sao Paulo, Brazil, 66-83.
Matiisen, "Teacher-Student Curriculum Learning," IEEE Transactions on Neural Networks and Learning Systems, Sep. 9, 2019, 31(9):3732-3740.
Ren et al., "Self-Paced Prioritized Curriculum Learning With Coverage Penalty in Deep Reinforcement Learning," IEEE Transactions on Neural Networks and Learning Systems, Feb. 1, 2018, 29(6):2216-22226.
Svetlik et al., "Automatic Curriculum Graph Generation for Reinforcement Learning Agents," Proceedings of the Thirty-First AAAI Conference on Artificial Intelligence, Feb. 4-9, 2017, San Francisco, California, USA, 2590-2596.

* cited by examiner

100

Train Catching Basketball

Environment A from Scene Grammar A
✓ Environment B from Scene Grammar B
Environment C from Scene Grammar C
Environment D from Scene Grammar D
Environment E from Scene Grammar E

— 120A

Train Dribbling Basketball

✓ Environment A from Scene Grammar A
Environment B from Scene Grammar B
Environment C from Scene Grammar C
Environment D from Scene Grammar D
Environment E from Scene Grammar E

— 120B

Train Shooting Basketball

Environment A from Scene Grammar A
Environment B from Scene Grammar B
Environment C from Scene Grammar C
✓ Environment D from Scene Grammar D
Environment E from Scene Grammar E

— 120C

Layup Curriculum

Catch – Environment B
Dribble – Environment A
Shoot – Environment D

SCENE GRAMMAR BASED REINFORCEMENT LEARNING IN AGENT TRAINING

TECHNICAL FIELD

This disclosure generally relates to agent-based crowd simulation.

BACKGROUND

Systems may train automated, intelligent agents (or "intelligent bots") to simulate the performance of tasks. An intelligent agent may be an autonomous entity which acts upon an environment using observation through sensors and consequent actuators, directing its activity towards achieving goals. Intelligent agents may also learn or use knowledge to achieve their goals. Intelligent agents may be very simple or very complex.

SUMMARY

In general, an aspect of the subject matter described in this specification may involve a process for reinforcement learning in agent training. Agents may be trained using reinforcement learning. Reinforcement learning is an area of machine learning concerned with how software agents ought to take actions in an environment in order to maximize the notion of cumulative reward.

However, reinforcement learning is a tedious process. Certain behaviors may be best learned in certain environments. For example, an agent will not learn to walk in a straight line when training in a circular room that is three feet wide as there is no space for the agent to walk. In another example, an agent may be more likely to learn to walk in a straight line in an environment where there are no walls and the ground is flat as the agent may freely walk around.

There is a problem in reinforcement learning in that end users want human-like behavior, that are described at a high level, but don't have the time, resources, expertise to manually generate various environments and hope that one produces the sort of agent behavior desired. A system may provide assistance to the end user who, like a high school teacher, can pick the curriculum of simpler subjects they want so that their students can achieve mastery. A curriculum of simple behaviors may be conceptually a complex behavior. By creating environments that induce particular simple behaviors in a reinforcement learning agent, environments may be selected that more explicitly define the agent's behavior.

One innovative aspect of the subject matter described in this specification is embodied in a method that includes the actions of obtaining scene grammars, obtaining a reference video of a reference agent performing a task, generating environments from the scene grammars, determining that behavior of a sample agent shown in a particular environment of the environments matches behavior of the reference agent, storing an indication that the particular environment trains agents to perform the task, determining to train a new agent to perform the task, identifying the particular environment based on the indication, and training the new agent to perform the task in the particular environments identified.

Another innovative aspect of the subject matter described in this specification is embodied in a method that includes the actions of obtaining scene grammars, obtaining a reference video of a reference agent performing a task, generating environments from the scene grammars, where the environments includes a particular environment produced from a particular scene grammar, determining that behavior of a sample agent shown in the particular environment of the environments matches behavior of the reference agent, storing an indication that the particular scene grammar produces environments that train agents to perform the task, determining to train a new agent to perform the task, identifying the particular scene grammar based on the indication, and training, with the particular scene grammar that was identified, the new agent to perform the task.

These and other implementations can each optionally include one or more of the following innovative aspects. In certain aspects, determining that behavior of a sample agent shown in a particular environment of the environments matches behavior of the reference agent includes determining an amount of similarity between movement of the reference agent in the reference video and movement of the sample agent in the particular environment.

In some implementations, determining that behavior of a sample agent shown in a particular environment of the environments matches behavior of the reference agent is in response to determining that the amount of similarity between the movement of the reference agent in the reference video and the movement of the sample agent in the particular environment is greater than an amount of similarity between the movement of the reference agent in the reference video and movement of the sample agent in a second particular environment.

In some aspects, the second particular environment is one of the environments generated from the scene grammars. In certain aspects, determining that behavior of a sample agent shown in a particular environment of the environments matches behavior of the reference agent includes generating additional scene grammars from the scene grammar from which the particular environment was generated and generating the second particular environment from the additional scene grammars.

In some implementations, storing an indication that the particular environment trains agents to perform the task includes not storing an indication that the second particular environment trains agents to perform the task. In certain aspects, storing an indication that the particular environment trains agents to perform the task includes determining that the amount of similarity determined for the particular environment and the amount of similarity determined for the second particular environment both satisfy selection criteria and storing a second indication that the second particular environment trains agents to perform the task.

In some aspects, storing an indication that the particular environment trains agents to perform the task includes generating additional environments from the scene grammar from which the particular environment was generated and storing additional indications that the additional environments train agents to perform the task. In some implementations, the task is a subtask in a root task that includes other subtasks, where training the new agent to perform the task in the particular environment identified includes training the new agent to perform the root task by training the new agent to perform each of the subtasks in corresponding environments. In certain aspects, storing an indication that the particular environment trains agents to perform the task includes storing the particular environment and the indication within the particular environment.

Other embodiments of this aspect include corresponding computer systems, apparatus, and computer programs recorded on one or more computer storage devices, each being configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference symbols in the various drawings indicate like elements.

DETAILED DESCRIPTION

Figure 1:
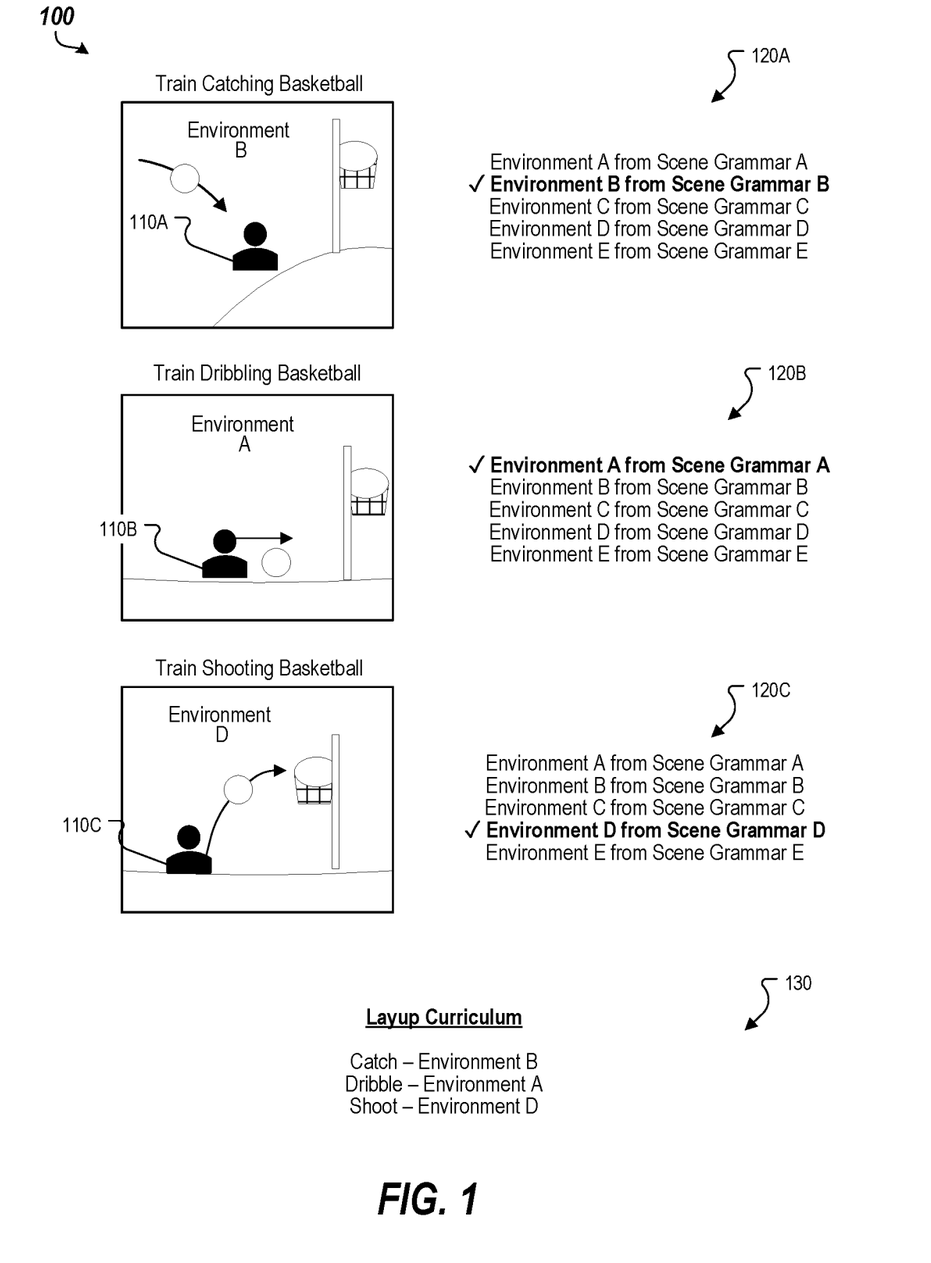
FIG. 1 illustrates a diagram of scene grammar based reinforcement learning in agent training.

FIG. 1 illustrates a diagram 100 of scene grammar based reinforcement learning in agent training. Agents are trained in a set of environments generated from respective scene grammars. For example, agents 110A may be separately trained in the environments A-F that are each generated from scene grammars A-F, respectively.

An environment may represent objects hierarchically. As an example, for a bedroom there may be multiple levels of abstraction defining the objects in the environment. There may be the category of the room itself, and then one level of categorization below that may be the groups of objects for example the desk objects, the bed objects, the dresser objects. Then within those groups, there may be objects themselves, for example a shirt, pants, pair of socks within the dresser objects.

There is theoretically no possible limit to the number of abstractions and their groupings. An environment may be described down to the minute detail of individual threads in the carpet if desired. In some implementations described herein, the lowest level of abstraction that the system may use is the level of a regular 3D object created by a regular 3D modeler for any architectural, video game, or movie animation. Example regular 3D objects may include a bookcase or a book or a desk.

Once an environment is described in a hierarchical way, probabilistic rules may be defined that govern the relationships between the objects. For example, there is a low probability people place beds in the center of rooms. People usually group books and desks close together. People generally put things against walls. Probabilistic rules may be defined that describe these relationships, and there may be a near infinite variation of these probabilistic rules to describe how a room is arranged. It may take a long time to figure out probabilistic rules that are "good enough" by sampling room designers and asking the designers to write out all the heuristics/guiding principles they use in organizing a room.

Accordingly, grammars may be used instead. Correct English sentences may be produced using English grammar, where the grammar defines what relationships between words are appropriate in the English language. Correspondingly, a scene grammar may define the relationships between objects in an environment. Thus, combining all these concepts, a scene grammar may define the objects in an environment and the relationships between them, like distance, grouping etc. Scene grammars may be programmatically used to generate a near infinite number of environments that look and feel similar to human eyes.

A system may use the environments to train agents to perform a task that includes different subtasks. For example, the system may be used to train agents to perform a task of a layup, which includes the subtasks of catching a ball, dribbling the ball closer to a basket, and then shooting the ball into the basket. A subtask may be considered a task that's included in another task, and a task that includes subtasks may be referred to as a root task. A subtask may also include its own subtasks. For example, the subtask of catching a ball may include additional subtasks of moving to a ball and holding the ball.

A system may determine whether agents successfully performed subtasks in the environments. For example, the system may determine that, from among environments 120$a$, the agent 110A successfully caught a basketball in environment B from scene grammar B and did not successfully catch a basketball in the other environments. In another example, the system may determine that, from among environments 120$b$, the agent 110B successfully dribbled a basketball in environment A from scene grammar A and did not successfully dribble a basketball in the other environments. In yet another example, the system may determine that, from among environments 120$c$, the agent 110C successfully shot a basketball through a basket in environment D from scene grammar D and did not successfully shoot the basketball through the basket in the other environments.

Additionally, scene grammars may be evolved to produce complex and meaningful environments that reinforcement learning agents can train on and learn to behave in human-like ways. An evolutionary algorithm may be used to generate a variety of scene grammars. Evolutionary algorithms may operate in the same way that evolution does: the fittest of one generation may be selected, then their genes may be combined, then mutated somewhat.

An end user may have a hand in the selection process, defining what is considered more fit. The end user may pause the evolution process periodically, inspect how the reinforcement learning agents are performing, and then choose which environments, and therefore which scene grammars, the agents performed the simple behavior best at. Alternatively, selection of environments to train measurable simple behaviors may require no end user guidance. For example, a system may automatically determine which environments maximize a measured behavior, e.g., decreasing distance between agents who have families in a disaster relief scenario, or keeping at least six feet away for social distancing during an epidemic.

Once the end user is happy that the agents have learned how to perform that simple behavior, or the system determines that agents have sufficiently learned the simple behavior, the chosen scene grammar and/or environment may be associated with that simple behavior. This may be repeated for all the simple behaviors the end user wants to see, and the end user or the system may then choose a curriculum of simple behaviors for a fresh agent to learn and perform like a human would. For example, the system may store a layup curriculum 130 that indicates that agents may be trained to perform the subtask of catch in environment B, the subtask of dribble in environment A, and the subtask of shoot in environment D.

Figure 2A:
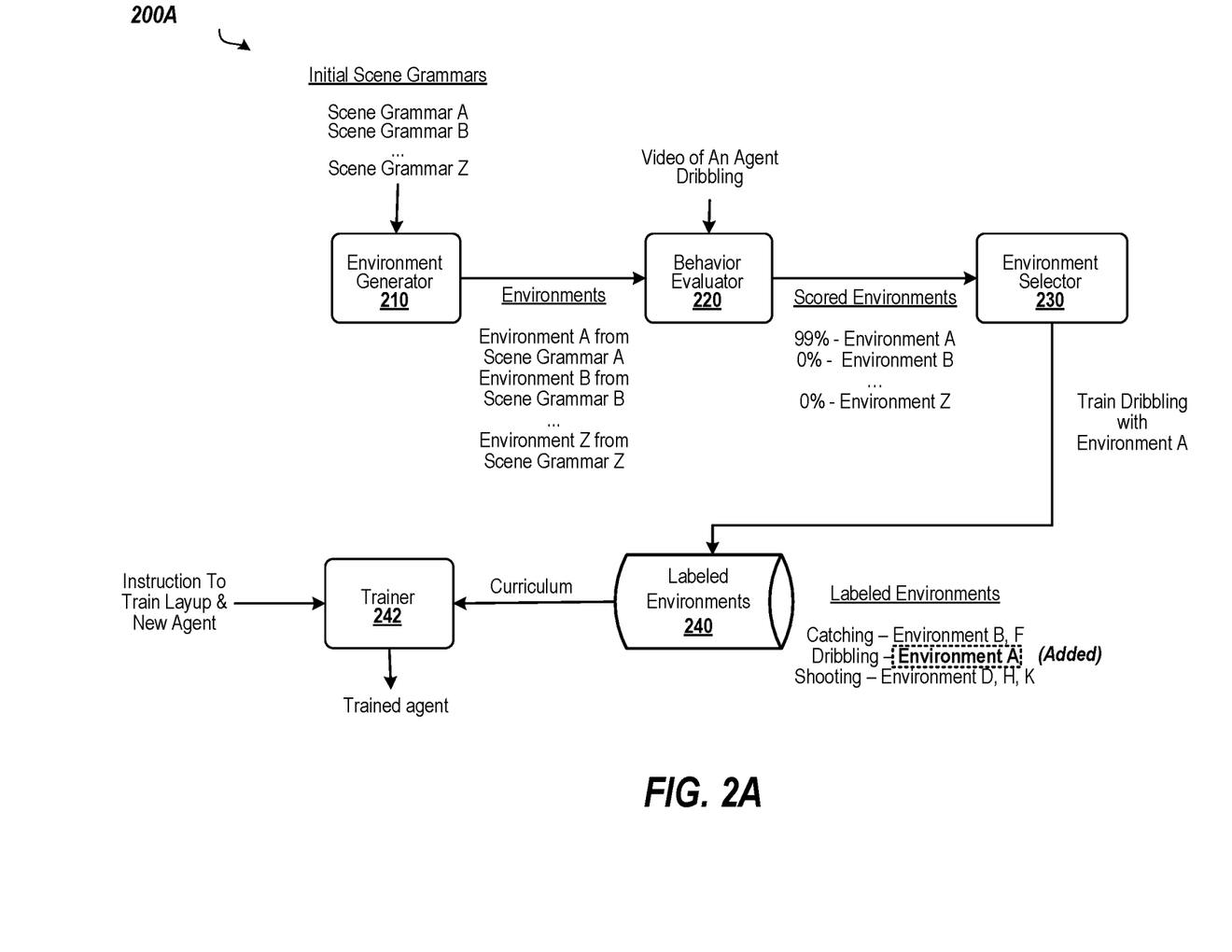
FIG. 2A illustrates a block diagram of an example system that indicates which environments generated from scene grammars are to be used for agent training.

FIG. 2A illustrates a block diagram of an example system 200A that indicates which environments generated from scene grammars are to be used for agent training. The system 200A includes an environment generator 210, a behavior evaluator 220, an environment selector 230, a labeled environment data store 240, and a trainer 242.

The environment generator 210 may receive initial scene grammars. For example, the environment generator 210 may receive scene grammars A-Z. The initial scene grammars may be a default set of scene grammars used to determine whether agents perform a task. For example, the initial scene grammars used to train an agent to dribble a ball may be the same initial scene grammars used to train an agent to catch a ball.

The environment generator 210 may use the initial scene grammars to generate environments. For example, the environment generator 210 may generate environments A-Z from scene grammars A-Z, respectively. While the environment generator 210 is shown in FIG. 2A as only generating a single environment from each scene grammar, the environment generator 210 may generate multiple environments from a single scene grammar. For example, the environment generator 210 may generate fifty environments from scene grammar A. The environment generator 210 may generate one or more environments from a scene grammar by randomly generating an environment according to the probabilistic rules specified by the scene grammar.

The behavior evaluator 220 may obtain the environments and output a score that indicates a success of the environment in training the agent to perform the task. For example, the behavior evaluator 220 may determine that an agent successfully dribbled a ball in environment A and output a score of 100% for environment A, and did not dribble a ball in environment B and output a score of 0% for environment B.

The behavior evaluator 220 may evaluate the behavior of the agents based on receiving a video of a reference agent performing a task, determining a similarity between the reference agent performing the task and an agent being trained, and based on the similarity, providing a score that indicates a success of the environment in training the agent to perform the task. A reference agent may be a human or a virtual software agent. For example, the behavior evaluator 220 may obtain a video of a human dribbling a ball, determine that an agent being trained in environment A and a ball are both moving almost identically to how the reference agent and a ball are moving in the reference video and, in response, provide a score of 99% that indicates that environment A is very successful in training an agent to dribble.

In another, the behavior evaluator 220 may obtain a video of a human dribbling a ball in environment B, determine that both an agent being trained in environment B and a ball are moving very differently to how the reference agent and a ball are moving in the video and, in response, provide a score of 0% that indicates that environment B is very unsuccessful in training an agent to dribble.

The environment selector 230 receives the scores for the environments and selects one or more of the environments for use in training agents to perform the task. For example, the environment selector 230 may receive a score of 99% for environment A and 0% for the remaining environments, in response, select environment A for training an agent to dribble, and then store in the labeled environment data store 240 that environment A is to be used in training an agent to dribble. In another example, the environment selector 230 may receive a score of 99% for environment A, a score of 90% for environment J, a score of 20% for environment L, and 0% for the remaining environments, in response, determine that environment A and J have the two highest scores and, in response, select and store environments A and J. In yet another example, the environment selector 230 may receive a score of 99% for environment A, a score of 90% for environment J, a score of 20% for environment L, and 0% for the remaining environments, in response, determine that environment A and J are the only environments with scores greater than 50% and, in response, select and store environments A and J.

The labeled environment data store 240 may store the environments indicated as being used for training tasks. For example, the labeled environment data store 240 may already store environments B and F with respective labels that indicate that those environments are used to train the task of catching, the environments D, H, and K with respective labels that indicate that those environments are used to train the task of shooting, and, in response to an instruction from the environment selector, store environment A with a label that indicates environment A is to be used for training dribbling.

The trainer 242 may train new agents based on the environments stored in the labeled environment data store 240. When a new agent is later to be trained to perform a task, which may be a subtask in another task, the trainer 242 uses the environments stored in the labeled environment data store 240 to obtain an environment in which to train the new agent to perform the task. For example, the trainer 242 may determine to train a new agent to perform a layup and, in response and without further human interaction, determine that a layup includes dribbling, search the labeled environment data store 240 for environments labeled for use in training dribbling, obtain environment A as a result of the search, and then train the new agent to dribble in the environment A.

While the system 200A is shown as using the labeled environment data store 240, the system 200A may additionally or alternatively store scene grammars for use in training agents. For example, once the environment selector 230 selects environment A, the environment selector 230 may then store in a data store scene grammar A from which environment A was generated. In the example, when a new agent is to be trained to dribble, the system 200A may then obtain the scene grammar A and generate one or more environments from scene grammar A to train the new agent to dribble.

In some implementations, the functionality of the environment generator 210, the behavior evaluator 220, the environment selector 230, the labeled environment data store 240, and the trainer 242 may be combined or redistributed. For example, the functionality of the behavior evaluator may be incorporated into the environment selector.

Figure 2B:
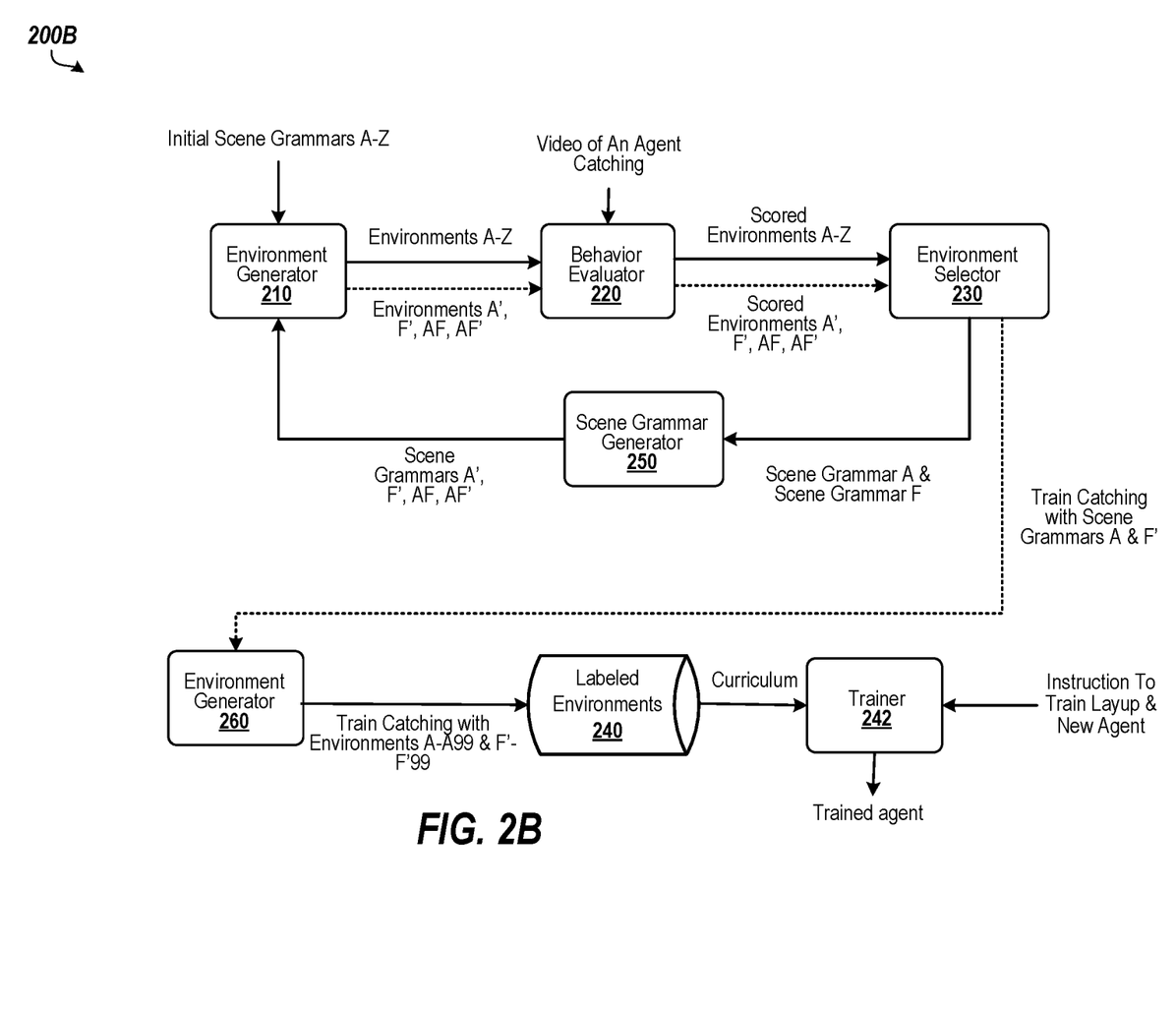
FIG. 2B illustrates a block diagram of another example system that indicates which environments generated from scene grammars are to be used for agent training.

FIG. 2B illustrates a block diagram of another example system 200B that indicates which environments generated from scene grammars are to be used for agent training. The system 200B may be similar to system 200A including the environment generator 210, the behavior evaluator 220, the environment selector 230, the labeled environments 240, and the trainer 242, but additionally include a scene grammar generator 250 and an environment generator 260.

The scene grammar generator 250 may implement an evolutionary algorithm in the system 200B. The scene grammar generator 250 may receive one or more scene grammars and then generate additional scene grammars from the one or more scene grammars. For example, the scene grammar generator 250 may receive scene grammars A and F that were determined by the environment selector 230 to be scene grammars from which environments were selected to train the task of catching and, in response, generate scene grammars A', F', AF, and AF'.

A' may be similar to scene grammar A with one or more random mutations. F' may be similar to scene grammar F with one or more random mutations. AF may be a combination of scene grammars A and F. AF' may be scene grammar AF with one or more random mutations. While the scene grammar generator 250 is shown as generating four scene grammars, additional or fewer scene grammars may be generated. For example, the scene grammar generator may generate one thousand different scene grammars from randomly mutating scene grammar A.

The environment generator 210, behavior evaluator, and environment selector 230 may then repeat generating environments, scoring environments, and selecting environments. Generating new scene grammars may be performed any number of times. For example, in some implementations the scene grammar generator 250 may be used to generate scene grammars only once and, in other implementations, the scene grammar generator 250 may be repeatedly used to generate scene grammars until the success determined for newly generated scene grammars is less than the success determined for previously generated scene grammars.

The environment selector 230 may then select one or more environments to use for training the task from all the environments. For example, the environment selector 230 may select environment A from the initial scene grammars and environment F' from a scene grammar generated by the scene grammar generator 250.

The environment selector 230 may then provide the scene grammars from which the selected environments were generated to the environment generator 260. The environment generator 260 may then generate one or more additional environments from the scene grammars and store the one or more additional environments in the labeled environment data store 240.

For example, the environment generator 260 may receive scene grammars A & F' for training catching, randomly generate ninety eight additional environments from each scene grammar, and then for each of the scene grammars, store each of the ninety nine environments in the labeled environment data store 240 with a label that the environments are to be used to train catching.

Alternatively, similar to system 200A, the environment selector 230 may store the selected environments in the labeled environment data store 240. For example, the environment selector 230 may store environments A and F' without generating and storing environments A2-A99 and F'2-F'99.

Figure 3:
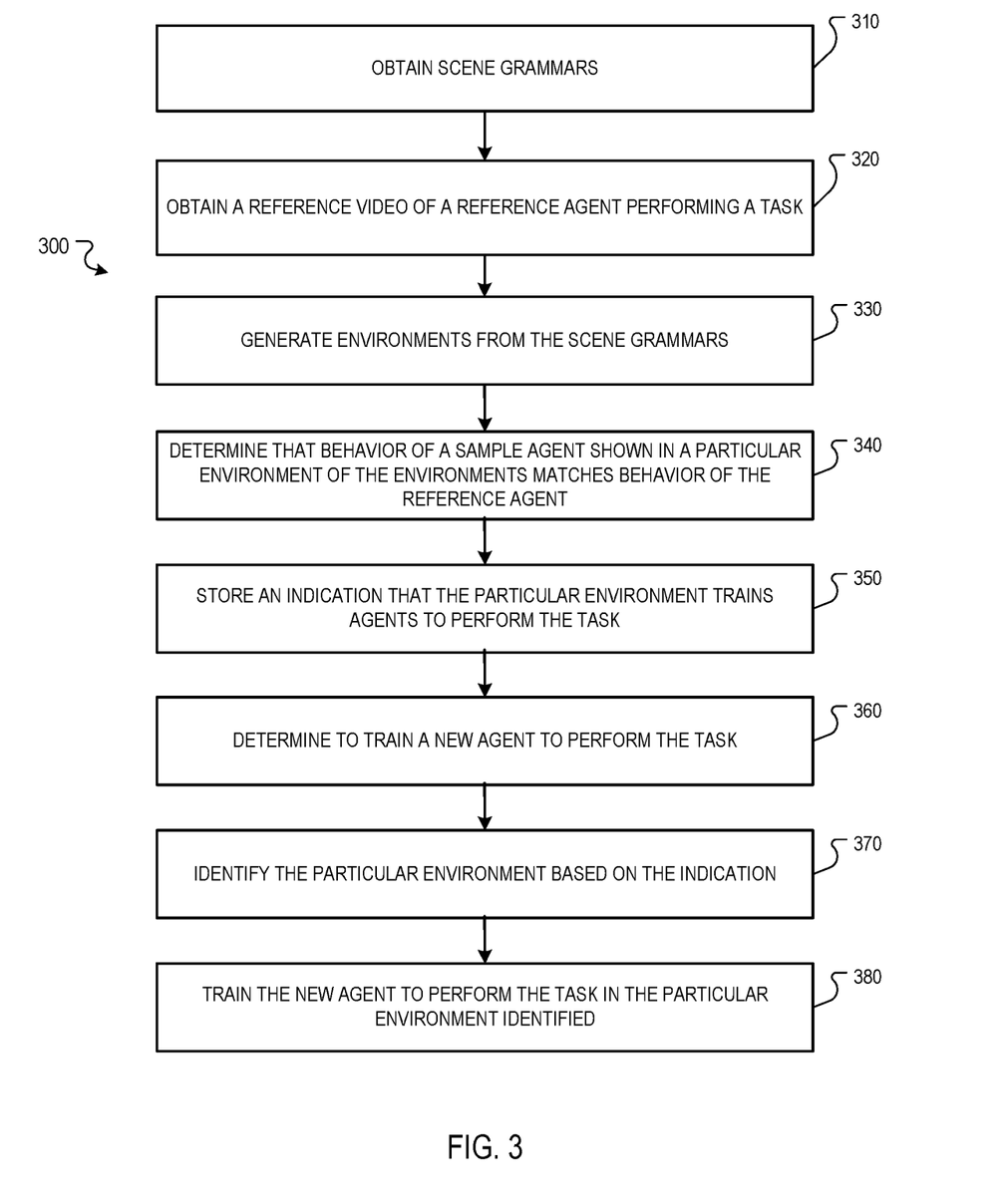
FIG. 3 illustrates a flowchart of an example process for scene grammar based reinforcement learning in agent training.

FIG. 3 illustrates a flowchart of an example process 300 for scene grammar based reinforcement learning in agent training. The process 300 includes obtaining scene grammars (310), obtaining a reference video of a reference agent performing a task (320), generating environments from the scene grammars (330), determining that behavior of a sample agent shown in a particular environment of the environments matches behavior of the reference agent (340), storing an indication that the particular environment trains agents to perform the task (350), determining to train a new agent to perform the task (360), identifying the particular environment based on the indication (370), and training the new agent to perform the task in the particular environment identified (380).

The process 300 includes obtaining scene grammars (310). For example, the environment generator 210 may obtain initial scene grammars from a data store that stores a set of grammars used to train agents to perform any task.

The process 300 includes obtaining a reference video of a reference agent performing a task (320). For example, the behavior evaluator 220 may receive a video of a human shooting a basketball through a hoop that was provided by an end user as an example of the task being performed.

The process 300 includes generating environments from the scene grammars (330). For example, the environment generator 210 may generate environments A-Z from scene grammars A-Z, respectively.

The process 300 includes determining that behavior of a sample agent shown in a particular environment of the environments matches behavior of the reference agent (340). For example, the environment selector 230 may determine that an agent moved a ball through a basket in environment D similarly to how a human shot a ball through a basket in the video.

In some implementations, determining that behavior of a sample agent shown in a particular environment of the environments matches behavior of the reference agent includes determining an amount of similarity between movement of the reference agent in the reference video and movement of the sample agent in the particular environment. For example, the behavior evaluator 220 may determine the visual similarity between the agent and ball moving in environment D during a period of time is 80% similar to how a human and ball move in the video and, in response, output a score of 80% which the environment selector 230 then uses to determine that behavior of a sample agent shown in environment D the environment of the environments matches behavior of the reference agent environment D.

In some implementations, determining that behavior of a sample agent shown in a particular environment of the environments matches behavior of the reference agent is in response to determining that the amount of similarity between the movement of the reference agent in the reference video and the movement of the sample agent in the particular environment is greater than an amount of similarity between the movement of the reference agent in the reference video and movement of the sample agent in a second particular environment. For example, the environment selector 230 may determine that a score of 80% for environment D is greater than a score of 10% for environment M and, in response, select environment D and not environment M.

In some implementations, the second particular environment is one of the environments generated from the scene grammars. For example, the second particular environment may be environment B that has a 0% score for training shooting a ball. In some implementations, determining that behavior of a sample agent shown in a particular environment of the environments matches behavior of the reference agent generating additional scene grammars from the scene grammar from which the particular environment was generated and generating the second particular environment from the additional scene grammars. For example, the environment selector may select environment D, the scene grammar generator 250 may then generate scene grammar D', the environment generator 210 may then generate environment D', the behavior evaluator 220 may score 20% for environment D', and the environment selector 230 may then select environment D over environment D' as the score of 80% for environment D indicates more success than the score of 20% for environment D'.

The process 300 includes storing an indication that the particular environment trains agents to perform the task (350). For example, the environment selector 230 may store environment D in the labeled environment data store 240 with a label of "shooting" which indicates that environment D is to be used to train the task of shooting. In some implementations, storing an indication that the particular environment trains agents to perform the task includes not storing an indication that the second particular environment trains agents to perform the task. For example, the environment selector 230 may not store an indication that environment D' is used to train shooting.

In some implementations, storing an indication that the particular environment trains agents to perform the task includes determining that the amount of similarity determined for the particular environment and the amount of similarity determined for the second particular environment both satisfy the selection criteria and storing a second indication that the second particular environment trains agents to perform the task. For example, the environment selector 230 may determine that 80% for environment D and 75% for environment H both satisfy a selection criteria of greater than or equal to 70% and, in response, store both environments D and H with labels that they are to be used to train the task "shooting."

In some implementations, storing an indication that the particular environment trains agents to perform the task includes generating additional environments from the scene grammar from which the particular environment was generated and storing additional indications that the additional environments train agents to perform the task. For example, the environment selector 230 may select environment F, which causes scene grammar generator 250 to mutate scene grammar F into scene grammar F', which then may be determined to have a score of 85% and selected for storage.

The process 300 includes determining to train a new agent to perform the task (360). For example, the trainer 242 may determine to train a new agent to catch a ball. The trainer 242 may receive user input that specifies the task itself, or may determine the task is a subtask in a root task. For example, the trainer 242 may receive user input which includes an instruction "train catch." In another, the trainer 242 may receive user input that includes an instruction "train layup," then determine from a pre-stored mapping or rule that layup is a root task that includes the subtasks of catch, dribble, and shoot, and in response, determine to train the agent to perform the task catch.

The process 300 includes identifying the particular environment based on the indication (370). For example, the trainer 242 may search the environments stored in the labeled environment data store 240 for environments that are labeled to be used to train catching and identify environment D.

The process 300 includes training the new agent to perform the task in the particular environment identified (380). For example, the trainer 242 may train the new agent to catch using environment D. In some implementations, the task is a subtask in a root task that includes other subtasks, where training the new agent to perform the task in the particular environment identified includes training the new agent to perform the root task by training the new agent to perform each of the subtasks in corresponding environments. For example, the trainer 242 may train the new agent to perform a layup by training the new agent to catch, then training the new agent to dribble, and then training the new agent to shoot.

Additionally or alternatively, the trainer 242 may train the agent to perform the tasks in another order. For example, the trainer 242 may train the agent to dribble, then shoot, and then catch. Additionally or alternatively, the trainer 242 may train the agent to perform the tasks in parallel. For example, the trainer 242 may train the agent in environment B which teaches catching, then environment A which teaches dribbling, then environment D which teaches shooting, then environment F which teaches catching, and then environment H and K which teach shooting.

Figure 4:
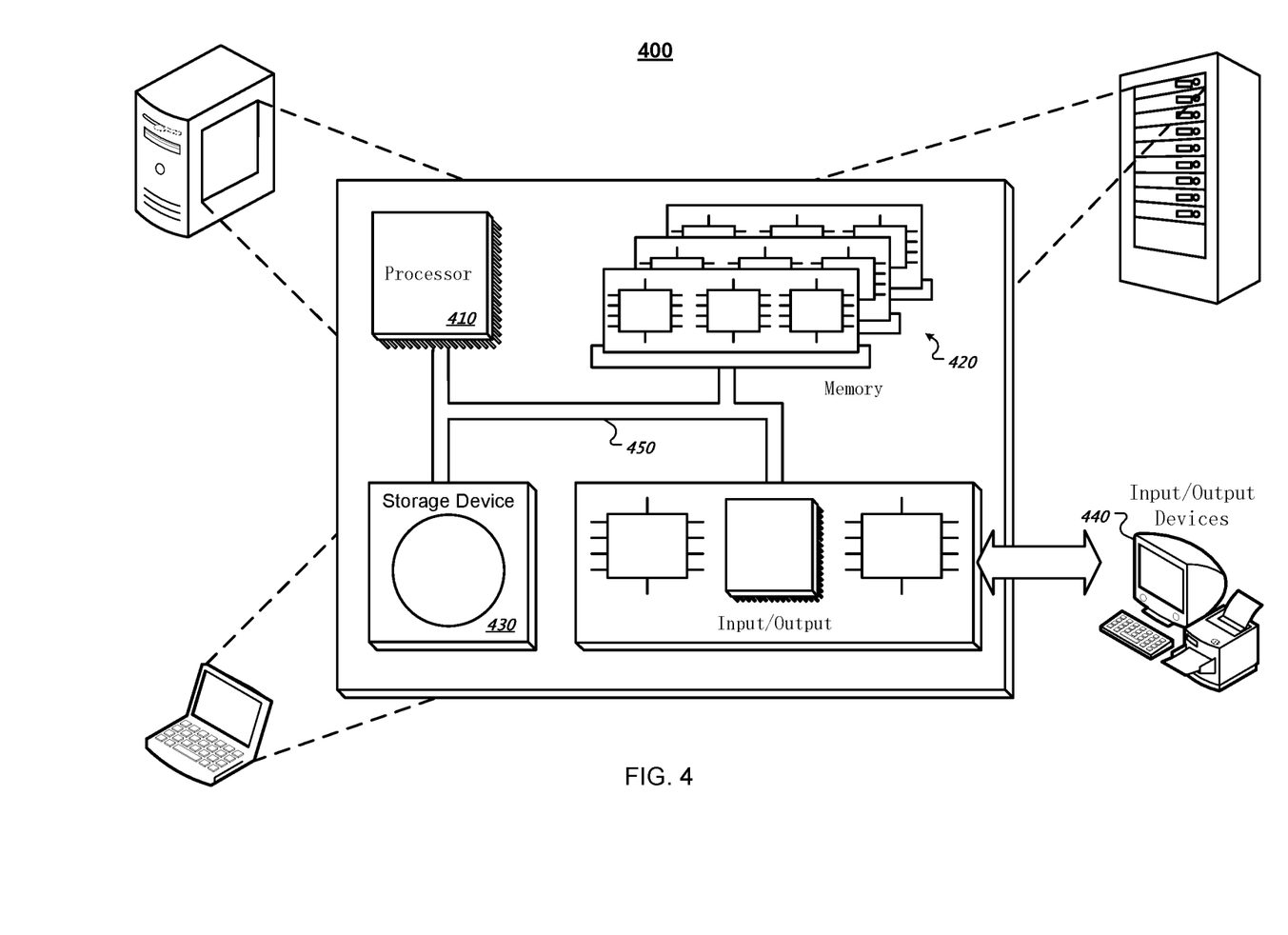
FIG. 4 illustrates a schematic diagram of an exemplary generic computer system.

FIG. 4 illustrates a schematic diagram of an exemplary generic computer system 400. The systems 200A and 200B described in FIGS. 2A and 2B may be implemented on the system 400. The system 400 includes a processor 410, a memory 420, a storage device 430, and an input/output device 440. Each of the components 410, 420, 430, and 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 may be a floppy disk device, a hard disk device, a solid state drive, an optical disk device, a tape device, a universal serial bus stick, or some other storage device.

The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps that can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used directly or indirectly in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard, and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. The servers may be part of a cloud, which may include ephemeral aspects.

What is claimed is:

1. A computer-implemented method, comprising:
   obtaining a first set of multiple scene grammars that programmatically generate synthesized training environments based on different probabilistic rules that define objects in a synthesized training environment or different relationships between the objects in the synthesized training environment;
   generating a second set of scene grammars by (i) introducing random mutations in at least a first subset of the first set of multiple scene grammars or (ii) combining at least a second subset of the first set of multiple scene grammars with one another:
   randomly generating multiple candidate synthesized training environments including generating a particular synthesized training environment using a particular scene grammar from among the second set of scene grammars;
   initiating training multiple sample virtual agents in the multiple candidate synthesized training environments including training of a sample virtual agent in the particular synthesized training environment to perform a particular task;
   while the sample virtual agent is being trained in the particular synthesized training environment to perform the particular task:
      identifying a behavior of the sample virtual agent that is training in the particular synthesized training environment to perform the particular task;
      obtaining a reference video of a human agent performing the task;
      identifying a behavior of the reference human agent that is performing the task from the reference video; and
      determining that the behavior of the sample agent that is training in the particular synthesized training environment matches the behavior of the reference human agent that is performing the task is in response to:
         determining an amount of similarity between the movement of the reference human agent in the reference video and movement of the sample virtual agent in the particular synthesized training environment is greater than an amount of similarity between the movement of the reference human agent in the reference video and movement of the sample virtual agent in a different synthesized training environment generated by a different scene grammar,
         providing a first score based on determining the amount of similarity between the movement of the reference human agent in the reference video and the movement of the sample virtual agent in the particular synthesized training environment,
         providing a second score based on determining the amount of similarity between the movement of the reference human agent in the reference video and the movement of the sample virtual agent in the different synthesized training environment,
         selecting the particular synthesized training environment over the different synthesized training environment based on determining the first score is greater the second score;
   storing one or more indications that the synthesized training environment trains virtual agents to perform the particular task further comprises:
      storing a first indication that associates (i) the particular scene grammar being used to generate the particular synthesized training environment with (ii) training virtual agents to perform the particular task,
      wherein storing the first indication further comprises, determining an amount of similarity determined for the particular synthesized training environment is greater than an amount of similarity determined for a second particular synthesized training environment,
      wherein the second particular synthesized training environment is one of the multiple candidates synthesized training environments generated from the second set of scene grammars environment; and storing a second indication that associates (i) a second scene grammar being used to generate the second particular synthesized training environment with (ii) training virtual agents to perform the particular task, wherein storing the second indication further comprises, determining an amount of similarity determined for the particular synthesized training environment and an amount of similarity determined for the second particular synthesized training environment both satisfying a selection criteria;

determining to train a new virtual agent to perform the particular task;

selecting the one or more indications associating one of, the particular scene grammar which generates the particular synthesized training environment with training virtual agents to perform the particular task or the second scene grammar which generates the second particular synthesized training environment with training virtual agents to perform the particular task;

generating a new synthesized training environment using the selected, one or more indications, wherein the new synthesized training environment includes one of, the particular synthesized training environment or the second particular synthesized training environment; and initiating training the new virtual agent to perform the task using the new synthesized training environment.

2. The method of claim 1, comprising:
generating additional synthesized training environments from the scene grammar from which the particular synthesized training environment was generated; and
generating different synthesized training environments from different scene grammars.

3. The method of claim 1, comprising:
storing an indication that another synthesized training environment is not associated with training virtual agents to perform the particular task.

4. The method of claim 1, wherein storing an indication that associates the particular synthesized training environment with training virtual agents to perform the particular task comprises:
generating additional synthesized training environments from the particular scene grammar from which the particular synthesized training environment was generated; and
storing additional indications associating the additional environments with training virtual agents to perform the particular task.

5. A system comprising:
one or more computers and one or more storage devices storing instructions that are operable, when executed by the one or more computers, to cause the one or more computers to perform operations comprising:
obtaining multiple scene grammars that programmatically generate synthesized training environments based on different probabilistic rules that define objects in a synthesized training environment or different relationships between the objects in the synthesized training environment;
generating a second set of scene grammars by (i) introducing random mutations in at least a first subset of the first set of multiple scene grammars or (ii) combining at least a second subset of the first set of multiple scene grammars with one another;
randomly generating multiple candidate synthesized training environments including generating a particular synthesized training environment using a particular scene grammar from among the second set of scene grammars;
initiating training multiple sample virtual agents in the multiple candidate synthesized training environments including training of a sample virtual agent in the particular synthesized training environment to perform a particular task;
while the sample virtual agent is being trained in the particular synthesized training environment to perform the particular task:
identifying a behavior of the sample virtual agent that is training in the particular synthesized training environment to perform the particular task;
obtaining a reference video of a human agent performing the task;
identifying a behavior of the reference human agent that is performing the task from the reference video; and
determining that the behavior of the sample agent that is training in the particular synthesized training environment matches the behavior of the reference human agent that is performing the task is in response to:
determining an amount of similarity between the movement of the reference human agent in the reference video and movement of the sample virtual agent in the particular synthesized training environment is greater than an amount of similarity between the movement of the reference human agent in the reference video and movement of the sample virtual agent in a different synthesized training environment generated by a different scene grammar,
providing a first score based on determining the amount of similarity between the movement of the reference human agent in the reference video and the movement of the sample virtual agent in the particular synthesized training environment,
providing a second score based on determining the amount of similarity between the movement of the reference human agent in the reference video and the movement of the sample virtual agent in the different synthesized training environment,
selecting the particular synthesized training environment over the different synthesized training environment based on determining the first score is greater the second score;
storing one or more indications that the synthesized training environment trains virtual agents to perform the particular task further comprises:
storing a first indication that associates (i) the particular scene grammar that being used to generate the particular synthesized training environment with (ii) training virtual agents to perform the particular task, wherein storing the first indication further comprises, determining an amount of similarity determined for the particular synthesized training environment is greater than an amount of similarity determined for a second particular synthesized training environment,
wherein the second particular synthesized training environment is one of the multiple candidates synthesized training environments generated from the second set of scene grammars environment; and storing a second indication that associates (i) a second scene grammar being used to generate the second particular synthesized training environment with (ii) training virtual agents to perform the particular task, wherein storing the second indication further comprises, determining an amount of similarity determined for the particular synthesized training environment and an amount of similarity determined for the second particular synthesized training environment both satisfying a selection criteria;

determining to train a new virtual agent to perform the particular task;

selecting the one or more indications associating one of, the particular scene grammar which generates the particular synthesized training environment with training virtual agents to perform the particular task or the second which generates the second particular synthesized training environment with training virtual agents to perform the particular task;

generating a new synthesized training environment using the selected, one or more indications, wherein the new synthesized training environment includes one of, the particular synthesized training environment or the second particular synthesized training environment; and initiating training the new virtual agent to perform the task using the new synthesized training environment.

6. The system of claim 5, wherein the operations comprise:

generating additional synthesized training environments the scene grammar from which the particular synthesized training environment was generated; and generating different synthesized training environments from different scene grammars.

7. The system of claim 5, wherein the operations comprise:

storing an indication that another synthesized training environment is not associated with training virtual agents to perform the particular task.

8. The system of claim 5, wherein storing an indication that associates the particular synthesized training environment with training virtual agents to perform the particular task comprises:

generating additional synthesized training environments from the particular scene grammar from which the particular synthesized training environment was generated; and storing additional indications associating the additional environments with training virtual agents to perform the particular task.

9. A non-transitory computer-readable medium storing software comprising instructions executable by one or more computers which, upon such execution, cause the one or more computers to perform operations comprising:

obtaining a first set of multiple scene grammars that programmatically generate synthesized training environments based on different probabilistic rules that define objects in a synthesized training environment or different relationships between the objects in the synthesized training environment;

generating a second set of scene grammars by (i) introducing random mutations in at least a first subset of the first set of multiple scene grammars or (ii) combining at least a second subset of the first set of multiple scene grammars with one another;

randomly generating multiple candidate synthesized training environments including generating a particular synthesized training environment using a particular scene grammar from among the second set of scene grammars;

initiating training multiple sample virtual agents in the multiple candidate synthesized training environments including training of a sample virtual agent in the particular synthesized training environment to perform a particular task;

while the sample virtual agent is being trained in the particular synthesized training environment to perform the particular task:

identifying a behavior of the sample virtual agent that is training in the particular synthesized training environment to perform the particular task;

obtaining a reference video of a human agent performing the task;

identifying a behavior of the reference human agent that is performing the task from the reference video; and determining that the behavior of the sample agent that is training in the particular synthesized training environment matches the behavior of the reference human agent that is performing the task is in response to:

determining an amount of similarity between the movement of the reference human agent in the reference video and movement of the sample virtual agent in the particular synthesized training environment is greater than an amount of similarity between the movement of the reference human agent in the reference video and movement of the sample virtual agent in a different synthesized training environment generated by a different scene grammar, providing a first score based on determining the amount of similarity between the movement of the reference human agent in the reference video and the movement of the sample virtual agent in the particular synthesized training environment, providing a second score based on determining the amount of similarity between the movement of the reference human agent in the reference video and the movement of the sample virtual agent in the different synthesized training environment, selecting the particular synthesized training environment over the different synthesized training environment based on determining the first score is greater the second score;

storing one or more indications that the synthesized training environment trains virtual agents to perform the particular task further comprises:

storing a first indication that associates (i) the particular scene grammar being used to generate the particular synthesized training environment with (ii) training virtual agents to perform the particular task, wherein storing the first indication further comprises, determining an amount of similarity determined for the particular synthesized training environment is greater than an amount of similarity determined for a second particular synthesized training environment, wherein the second particular synthesized training environment is one of the multiple candidates synthesized training environments generated from the second set of scene grammars environment; and storing a second indication that associates (i) a second scene grammar being used to generate the second particular synthesized training environment with (ii) training virtual agents to perform the particular task, wherein storing the second indication further comprises, determining an amount of similarity determined for the particular synthesized training environment and an amount of similarity determined for the second particular synthesized training environment both satisfying a selection criteria;

determining to train a new virtual agent to perform the particular task;

selecting the one or more indications associating one of, the particular scene grammar which generates the particular synthesized training environment with training virtual agents to perform the particular task or the second scene grammar which generates the second particular synthesized training environment with training virtual agents to perform the particular task;

generating a new synthesized training environment using the selected, one or more indications, wherein the new synthesized training environment includes one of, the particular synthesized training environment or the second particular synthesized training environment; and initiating training the new virtual agent to perform the task using the new synthesized training environment.

10. The medium of claim 9, wherein the operations comprise:

generating additional synthesized training environments the scene grammar from which the particular synthesized training environment was generated; and generating different synthesized training environments from different scene grammars.

11. The medium of claim 9, wherein the operations comprise:

storing an indication that another synthesized training environment is not associated with training virtual agents to perform the particular task.

* * * * *